M. E. COMP.
VALVE.
APPLICATION FILED OCT. 6, 1914.
1,145,831.
Patented July 6, 1915.
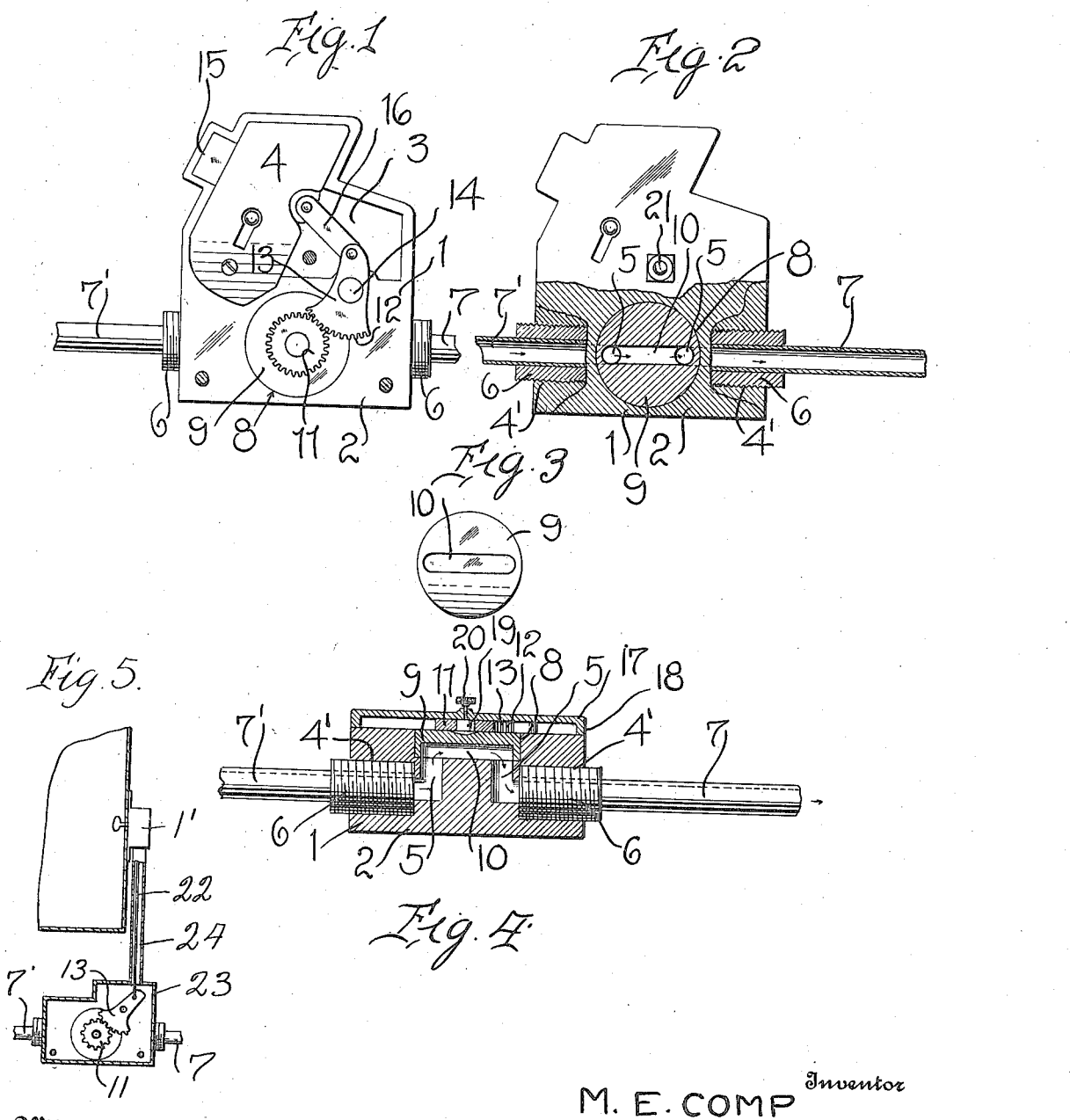
M. E. COMP, Inventor
By Watson E. Coleman, Attorney
Witnesses
Robert M. Sutphen
A. J. Hind

UNITED STATES PATENT OFFICE.

MUSSER E. COMP, OF FLINT, MICHIGAN.

VALVE.

1,145,831.  Specification of Letters Patent.  Patented July 6, 1915.

Application filed October 6, 1914. Serial No. 865,362.

*To all whom it may concern:*

Be it known that I, MUSSER E. COMP, a citizen of the United States, residing at Flint, in the county of Genesee and State of Michigan, have invented certain new and useful Improvements in Valves, of which the following is a specification, reference being had to the accompanying drawings.

This invention relates to new and useful improvements in valves and more particularly to a valve lock, the main object of the present invention being the provision of a valve having in connection therewith a lock whereby the valve may be locked in a closed position to prevent fluid from being drawn therefrom by unauthorized persons.

Another object of the present invention is the provision of a valve of the above character adapted to be located in the supply tube, between the gasolene supply tank and the carbureter of an automobile engine, whereby to prevent unauthorized persons from using the vehicle to which the lock is applied.

A further object of the present invention is the provision of a lock of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a top plan view, the cover of the casing being removed. Fig. 2 is a similar view, parts thereof being illustrated in horizontal section. Fig. 3 is a bottom plan view of the valve member; and Fig. 4 is a transverse sectional view of the body. Fig. 5 is a detail vertical sectional view illustrating the lock in position upon a dash-board and connected by means of a rod to the valve.

In carrying out my invention, I provide a body member which is generally indicated by the numeral 1, one end of which is solid, as shown at 2, while the other end thereof is provided with a recess 3, forming a casing for the lock 4. The solid portion 2 of the body 1, is provided upon opposite sides thereof with threaded bores 4' which are adapted to communicate with angularly disposed openings 5. Arranged within the threaded bores 4' are the connecting cables 6, one having a tube 7 which extends from the body of the lock to the carbureter of the engine, while the other tube 7' is adapted to be connected with the gasolene supply tank. One side of the portion 2 of the body is provided with a cylindrical recess 8, in which is mounted for rotation, a valve member 9 having a transverse recess 10 closed at both ends, and cut within one face thereof whereby when the valve is in its open position, the ends of the recess will communicate with the angular openings 5 to provide for direct communication between the tubes 7 and 7' and, upon the rotation of the valve member, the recess 10 will be disposed at right angles to the openings 5, whereby to cut off communication between the tubes 7 and 7'.

Connected with the valve member, is a gear 11 adapted to mesh with the geared face 12 of a cam 13, said cam being mounted for pivotal movement upon the post 14 and the inner end thereof connected with the bolt 15 of the lock 4, by means of a link 16, the connection between the cams 13 and the bolt 15 being pivoted, whereby to allow a free movement between the cam and the locking bolt.

From the above it will be apparent that upon longitudinal movement of the locking bolt 15, the valve member will be either opened or closed. As the locking bolt 15 is turned to an inoperative position, the cam 13 will be rotated upon its pivot 14, through the medium of the link 16, whereby the geared face thereof will actuate the gear 11 and rotate the valve member 9 to provide for direct communication between the tubes 7 and 7', by bringing the ends of the transverse recess 10 into communication with the angular openings 5. It will be apparent that while I have shown and particularly formed the lock in connection with my improved valve, it will be understood that any desired form of lock may be used so long as the locking bolt thereof is pivotally connected with the inner end of the cam 13, to actuate the same upon reciprocating movement of the locking bolt.

The body or casing 1 is provided with a cover member 17 having inwardly turned flanges 18 adapted to bear against the outer edges of the body whereby to provide for a suitable space between the cover 17 and the body. It will be noted that the valve member 9 is provided with an outwardly extending lug 19 forming a pivot for the gear 11. Arranged within the gear 17 and adapted to bear against this lug 19 is a set screw 20 whereby to securely retain the valve 9 against its seat and, at the same time provide means whereby the continual wear of the valve upon its inner face may be taken up. The cover and body 1 are securely retained in place by means of the transverse pin 21 which may be either in the form of a rivet or a bolt in order to retain the cover 17 in position upon the body 1.

In Fig. 5, I have illustrated a slightly modified form of the invention, wherein the lock itself is located upon the front of the dash of the vehicle and a locking bolt 15 is connected with the cam 13 by means of a rod 22 which extends down in front of the dash and into a casing 23, which incloses the valve. The rod 22 is inclosed within a suitable casing 24 tubular in form, as shown, one end of which is removably engaged with the casing 23, while the other end thereof is connected with the lock 1. From this it will be apparent that the rod 22 will be thoroughly protected against unauthorized persons and, at the same time, it will provide a device of the character set forth which is extremely simple in construction and is located entirely out of the way so that the side of the dash, next to the front seat will present a neat appearance there being only the key hole showing.

From the above description taken in connection with the accompanying drawing, it will be readily apparent that I have provided a simple and durable device whereby unauthorized persons will be prevented from obtaining the vehicle to which the device is applied, without the use of the key. The device itself is also extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a body, having transverse bores extending inwardly from the outer side and further provided with angular openings connected with the inner ends of said bores, a valve member carried by the body and having a transverse recess whereby to provide communication between the bores, a lock carried by the body, and means connecting said valve member with the lock whereby upon the actuation of the lock the valve may be opened or closed.

2. A device of the class described including a body having transverse bores extending inwardly from each side thereof and further provided with angular openings at the inner ends of the bores, a rotatable valve member having a transverse recess adapted to form communication between the bores, a gear carried by the valve, a pivoted cam having a geared face adapted to mesh with the gear, a lock carried by the body provided with a locking bolt, a link connecting the locking bolt with the cam whereby upon reciprocating movement of the locking bolt the valve will be opened or closed.

3. A device of the class described including a body having transverse bores extending inwardly from each side thereof and further provided with angular openings at the inner ends of the bores, a rotatable valve member having a transverse recess adapted to form communication between the bores, a gear carried by the valve, a lock carried by the body, and means carried by the body and forming a connection between the lock and gear, whereby to rotate said valve upon the actuation of the lock.

4. A device of the class described including a body having transverse bores extending inwardly from the outer side and further provided with angular openings connected with the inner ends of said bores, a valve member carried by the body and having a transverse recess whereby to provide communication between the bores, a gear carried by the valve, and means engaging the gear whereby to rotate the valve and open and close communication between the transverse bores.

In testimony whereof I hereunto affix my signature in the presence of two witnesses.

MUSSER E. COMP.

Witnesses:
J. N. DAYNONT,
R. E. MYERS.